United States Patent [19]

Park et al.

[11] Patent Number: 4,672,528
[45] Date of Patent: Jun. 9, 1987

[54] RESONANT INVERTER WITH IMPROVED CONTROL

[75] Inventors: John N. Park, Rexford; Robert L. Steigerwald, Scotia, both of N.Y.

[73] Assignee: General Electric Company, Schenectady, N.Y.

[21] Appl. No.: 866,818

[22] Filed: May 27, 1986

[51] Int. Cl.⁴ .................................... H02P 13/20
[52] U.S. Cl. .................................... 363/98; 363/17
[58] Field of Search .................. 363/17, 97, 98, 132, 363/9

[56] References Cited

U.S. PATENT DOCUMENTS

| | | | |
|---|---|---|---|
| 4,276,586 | 6/1981 | Boekhorst | 363/97 |
| 4,451,041 | 9/1985 | Park et al. | 363/41 |
| 4,535,399 | 8/1985 | Szepesi | 363/97 |

FOREIGN PATENT DOCUMENTS

| | | | |
|---|---|---|---|
| 2528636 | 12/1983 | France | 363/17 |
| 2060220 | 4/1981 | United Kingdom | 363/17 |
| 2130823 | 6/1984 | United Kingdom | 363/97 |
| 1008878 | 3/1983 | U.S.S.R. | 363/132 |

Primary Examiner—Peter S. Wong
Assistant Examiner—Judson H. Jones
Attorney, Agent, or Firm—Marvin Snyder; James C. Davis, Jr.

[57] ABSTRACT

A resonant inverter is operated in a manner to provide a substantially constant output voltage to a load. The inverter is controlled using either a frequency control mode or a phase shift control mode. In the frequency control mode, a constant output voltage is maintained through frequency variation of the rectangular wave signal applied to the resonant circuit of the inverter. In the phase shift control mode, constant output voltage is maintained by phase shifting one component signal of the rectangular wave signal relative to another component signal thereof while maintaining constant the frequency of both component signals. Mode switching occurs automatically at the extremities of the operating frequency range of controllable switch means in the resonant inverter.

12 Claims, 8 Drawing Figures

LOG FREQUENCY OF RECTANGULAR WAVE SIGNAL

RESONANT INVERTER WITH IMPROVED CONTROL

BACKGROUND OF THE INVENTION

This invention relates to resonant inverters and more particularly, to a resonant inverter with improved control allowing it to provide a substantially constant output voltage to a load over a wide range of operating conditions.

Operating dc-ac inverters with a resonant circuit is attractive since sine wave currents and voltages can be achieved, and since inverter switching devices can operate with low switching losses. Another advantage of using resonant inverters is the potential for obtaining reduced electromagnetic interference due to the low harmonic content of the sinusoidal current and voltages. One disadvantage of using resonant inverters, however, is that when input power or output load conditions are varying, output voltage or current control may not be achieved through the use of usual control techniques. This is because of the resonant nature of the circuit.

One known resonant inverter output load voltage or current control method is to vary the frequency of the rectangular wave signal supplied to the resonant circuit by the inverter via closed loop control. Commonly assigned U.S. Pat. No. 4,541,041, of Park et at., which is incorporated herein by reference, discloses in part such a frequency control technique. Briefly explained, the resonant nature of the circuit allows for control of output voltage or current through variation of the frequency at which the inverter's controllable switch means operate. Such a frequency control method has been found satisfactory under normal output load conditions for particular types of resonant inverters (i.e. heavy or medium load conditions for a series resonant inverter and light load conditions for a parallel resonant inverter). The drawback to frequency control, however, is that it may be inadequate to maintain a desired output voltage or current under extended output load conditions (i.e., light or no load conditions for a series resonant inverter and heavy load conditions for a parallel resonant inverter).

By way of example, frequency control of a series resonant inverter will normally be adequate to maintain a desired output voltage during heavy or medium load conditions (i.e., low resistance) because for heavy or medium load conditions, a series resonant circuit has high Q and thus a good dynamic range of voltage or current change as frequency is varied. However, under extended or light output load conditions (i.e., high resistance), the series resonant circuit exhibits a low Q and thus a small dynamic range of voltage or current change as a function of frequency. As a result, in the case of the series resonant inverter, it may be impossible to maintain a desired output voltage or current under light load and no load conditions solely with frequency control.

Therefore, there presently exists a need for a resonant inverter control which, under extended load conditions, provides an improved dynamic range of output voltage or current control than that which can be provided solely by closed loop frequency control.

SUMMARY OF THE INVENTION

Accordingly, a principal object of the present invention is to provide a resonant inverter exhibiting an improved dynamic range of output load voltage control under extended load conditions.

Another object of the present invention is to provide a resonant inverter capable of maintaining controlled output load voltage during all loading conditions.

Yet another object of the present invention is to provide a resonant inverter control which switches automatically between different control modes when necessary to maintain a desired inverter output load voltage.

It is a further object of the present invention to provide an improved method of operating a resonant inverter in order to maintain a desired output load voltage as input power or output load conditions vary.

Briefly, in accordance with a preferred embodiment of the invention, a resonant inverter having controllable switch means which produce a first component signal and a second component signal is provided. The component signals are combined to form a rectangular wave signal which is supplied to a resonant circuit. The resonant circuit supplies a sinusoidal waveform to a rectifier which produces a DC output voltage. This output voltage furnishes power to a load. An improved control for the inverter in part comprises means for varying the frequency of the rectangular wave signal supplied to the resonant circuit within an operable range of the controllable switch means. The control also includes means for phase shifting the second component signal relative to the first component signal while maintaining the rectangular wave signal frequency constant, and means for selecting between the frequency varying means and the phase shift varying means. The selecting means allows the control to operate in the frequency control mode when the frequency of the rectangular wave signal is within the operable range of the controllable switch means and in the phase shift control mode when the frequency of the rectangular wave signal is at an extremity of the operable range of the controllable switch means.

The invention also comprises a method for controlling output load voltage by varying the frequency of the rectangular wave signal within the operable range of the controllable switch means and phase shifting the second component signal relative to the first component signals when the frequency of the rectangular wave signal is at an extremity of the operable range of the controllable switch means.

BRIEF DESCRIPTION OF THE DRAWINGS

While the specification concludes with claims particularly pointing out and distinctly claiming the present invention, the objects, features and advantages of the invention can be more readily ascertained from the following detailed description of a preferred embodiment when read in conjunction with the accompanying drawings in which:

DETAILED DESCRIPTION OF THE INVENTION

Figure 1:
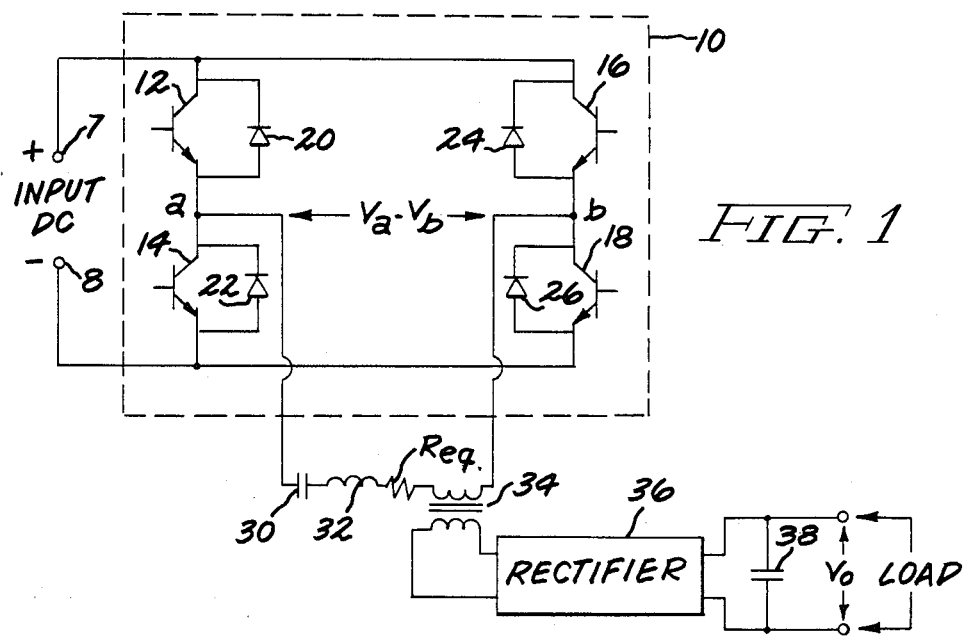
FIG. 1 is a schematic representation of a dc to dc converter including a voltage fed resonant inverter having a series connected load.

The functioning of the control of the present invention will now be described with reference to the resonant dc to dc converter shown in FIG. 1. An external source (not shown) provides input dc power at terminals 7 and 8. Connected across terminals 7 and 8 is a full bridge inverter 10. Inverter 10 has four switching devices that are capable of carrying reverse current and capable of being turned off by a switching signal. The switching devices are shown as bipolar junction power transistors 12, 14, 16 and 18, each switching device having an inverse diode 20, 22, 24, and 26 connected in parallel, respectively. The full bridge inverter is illustrated for purposes of description and it is to be understood that the control technique of the present invention is not limited to such an inverter. Similarly, other switching devices with gate turn-off capability could be used instead of the parallel connected transistor diode combination. Such switching devices include power metal-oxide semiconductor field effect transistors (MOSFETs) (reverse current carried by an integral parasitic diode), monolithic Darlingtons (reverse current carried by a parasitic diode), insulated gate transistors (IGTs) and gate turn-off silicon controlled rectifiers each having a diode connected in inverse parallel. The output of inverter 10 is available across junctions a and b between series connected transistors 12 and 14, and series connected transistors 16 and 18, respectively.

Connected between junctions a and b is a series resonant circuit comprising a capacitor 30, an inductor 32, and the primary winding of a transformer 34. The secondary widing of transformer 34 is connected to the input of a full wave rectifier 36. The output of full wave rectifier 36 is connected in parallel with a filter capacitor 38 and an output load (not shown), across which the converter output voltage $V_o$ is produced. An equivalent resistant $R_{eq}$ is reflected back into the series resonant circuit through transformer 34.

Figure 2:
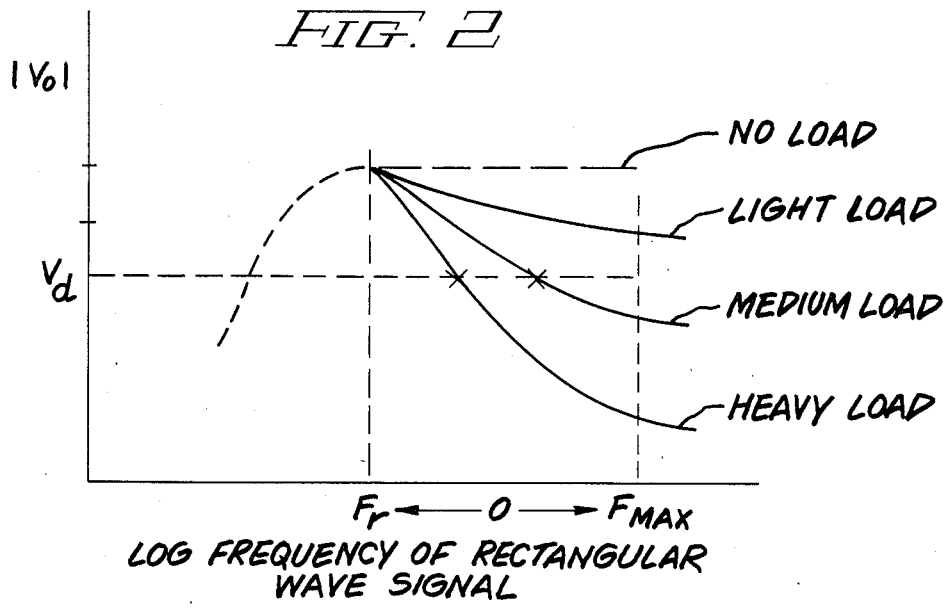
FIG. 2 is a graphical illustration showing the magnitude of the output voltage plotted against the log of the frequency of the rectangular wave signal supplied to the resonant circuit employed in the inverter of FIG. 1, for heavy load, medium load, light load and no load conditions.

The resonant nature of the output load voltage of inverter 10 illustrated in FIG. 1 is shown graphically in FIG. 2, where the magnitude of the output load voltage is plotted against the log of the frequency of the rectangular voltage wave signal $V_a - V_b$ across the series resonant circuit. For proper power switch commutation, operation above the natural resonant frequency $F_r$ is necessary for self commutating devices such as the illustrated bipolar junction power transistors 12, 14, 16 and 18. However, there is a maximum frequency $F_{max}$ beyond which these switching devices will fail to operate satisfactorily. Thus, an operable range o of the switching devices is defined as that frequency range between $F_r$ and $F_{max}$. During normal output load conditions, variation of frequency within this operable range o is usually sufficient to provide the desired output voltage or current control. This concept is illustrated graphically in FIG. 2 for the series resonant inverter, where it can be seen that a desired converter output load voltage $V_d$ may be maintained during heavy load and medium load conditions by frequency control of the rectangular wave voltage signal $V_a - V_b$ across terminals a and b in the circuit of FIG. 1. It can also be seen, however, that during light load and theoretical no load conditions, variation of frequency within the operable range o would be insufficient to attain the desired output load voltage $V_d$. The present invention therefore employs a control technique for enhancing the dynamic range of converter output voltage control primarily needed under light or no load conditions.

The control technique of the present invention may be better understood with reference to the waveforms illustrated in FIGS. 3A-E. Inverter 10 typically operates so as to produce one square wave voltage signal $V_a$ at point a, and another square wave voltage signal $V_b$ at point b, 180° out of phase relative to square wave voltage signal $V_a$ (see FIGS. 3A and 3B). For purposes of discussion, square wave voltage signal $V_a$ will be hereinafter referred to as a first component signal and square wave voltage $V_b$ will be hereinafter referred to as a second component signal. It should be understood, however, that in the following description it is the relative phasing of square wave voltage signals $V_a$ and $V_b$ that is important and not which signal is denominated as "first" or "second".

Figure 3:
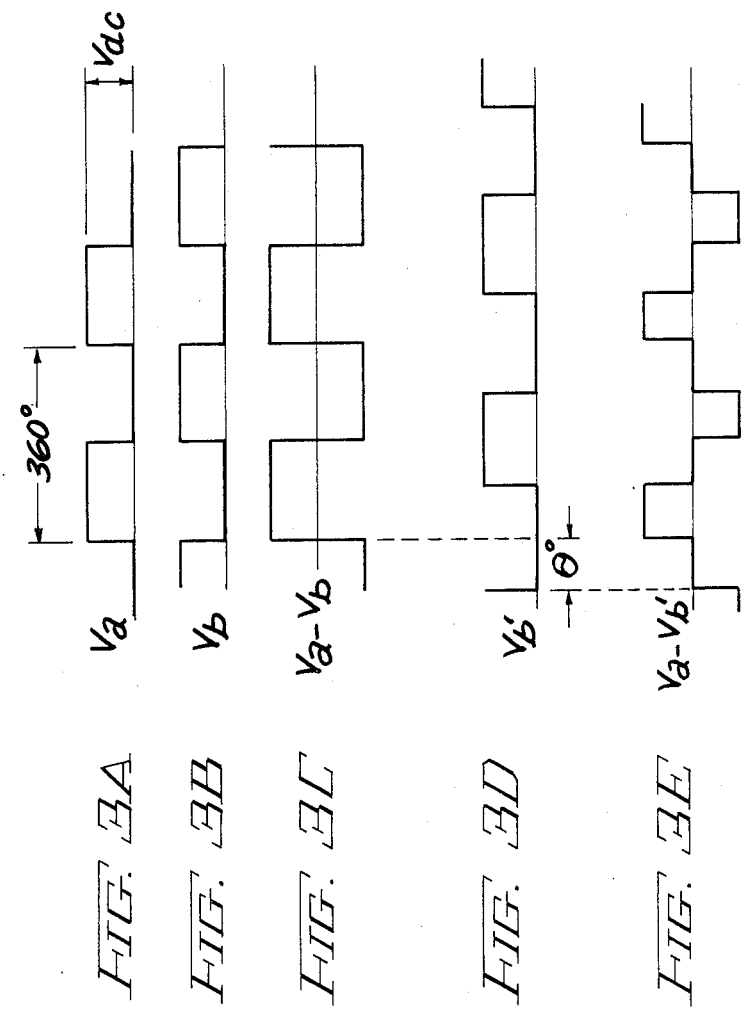
FIGS. 3A–3E are waveform diagrams helpful in explaining the operation of the control technique of the present invention.

The net effect of producing a first square wave signal $V_a$ and a second square wave voltage signal $V_b$ 180° out of phase relative to $V_a$ is to place an ac square wave voltage $V_a - V_b$ across points a and b (see FIG. 3C). As mentioned earlier, the frequency of voltage signal $V_a - V_b$ may be varied within an operable range o of the switching devices in order to control output load voltage or current. The control techique of the present invention is to combine this frequency control with phase shift control when needed to maintain a constant output load voltage.

The dynamic range of converter output load voltage control may be greatly increased during light load conditions by shifting the phase of the second voltage square wave signal $V_b$ relative to the first voltage square wave signal $V_a$ while maintaining the frequency substantially constant. As shown in FIGS. 3D and 3E, by phase shifting or phase delaying the second square wave voltage signal $V_b'$ by $\theta$ degrees, a rectangular wave signal $V_a - V_b'$ will result. The particular rectangular wave voltage signal $V_a - V_b'$ appearing across points a and b will vary as the extent of the phase shift varies. For example, the rectangular wave voltage signal $V_a - V_b'$ for a particular frequency will vary from a maximum average value when the phase shift $\theta$ is 0° to a minimum average value (i.e., zero) when the phase shift is 180°. In addition, the converter output load voltage will vary correspondingly as the average value of the rectangular wave voltage signal $V_a - V_b'$ varies. Thus, when the frequency is at either extremity of the operable range o of the inverter switching devices, the dynamic range of output voltage control may be greatly expanded by phase shifting the second square wave voltage signal $V_b$ relative to the first square wave voltage signal $V_a$.

The square wave voltage $V_a - V_b$ or $V_a - V_b'$ is changed to a sinusoidal waveform by the resonant circuit connected across points a and b in the circuit of FIG. 1. Full wave rectification, and filtering, of the sinusoidal waveform supplied to rectifier 36 by transformer 34 is provided by rectifier 36 and capacitor 38, respectively, to produce a substantially smooth dc output voltage $V_o$ which can be maintained constant over an expanded dynamic range of inverter output frequencies.

Figure 4:
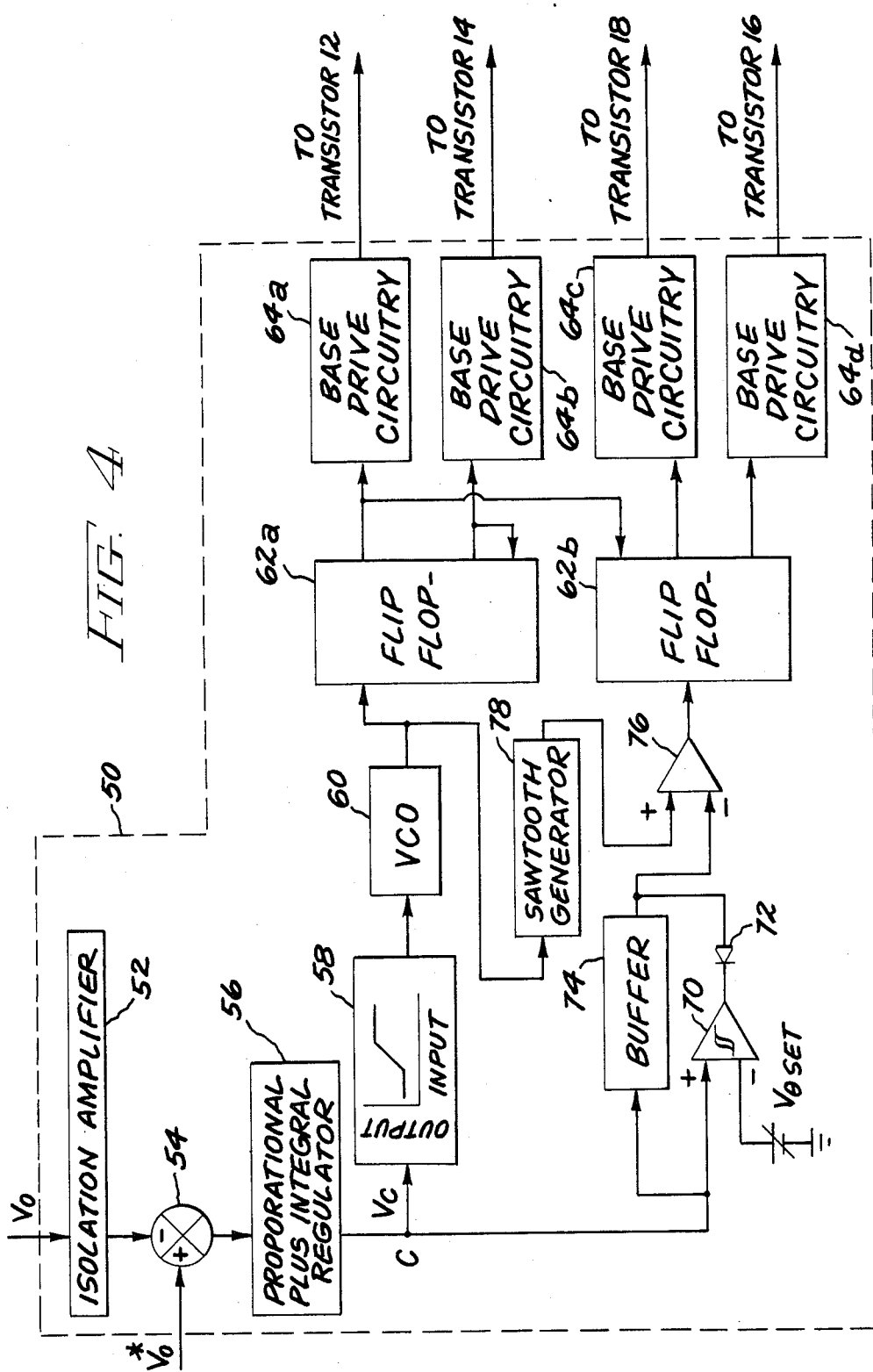
FIG. 4 is a part block diagram, part schematic representation of the closed loop frequency and phase shift control of the present invention.

One preferred embodiment of the control of the present invention which can be advantageously employed with the resonant dc to dc converter of FIG. 1 will now be described. Referring to FIG. 4, control 50 receives a commanded converter output voltage $V_o^*$ and actual converter output load voltage $V_o$ as input signals. The converter output load voltage $V_o$ is received by an isolation amplifier 52 which acts as a buffer. The output signal of isolation amplifier 52 is compared in the summer 54 with the commanded converter output voltage $V_o^*$ and the resulting error signal is passed through a proportional plus integral regulator circuit 56, resulting in a control signal $V_c$ at junction c. The regulator 56 shown does not invert the signal.

From junction c, control signal $V_c$ is supplied to a limit amplifier circuit 58. Limit amplifier circuit 58 provides a predetermined maximum output signal in response to a maximum control signal and a predetermined minimum output signal in response to a minimum control signal. The curve shown in block 58 represents the transfer function of the amplifier with the X-axis representing the input control signal and the Y-axis the resulting output signal. Limit circuit 58 essentially serves to constrain the rectangular wave voltage signal $V_a - V_b$ within its operable range. The output signal of the limit circuit is provided to a voltage controlled oscillator 60 which generates an ac signal of frequency corresponding to the applied voltage amplitude. The oscillator output signal is supplied to a first flip-flop 62a and, in the frequency control mode, also affects a second flip-flop 62b via a sawtooth generator 78. The outputs of flip-flops 62a and 62b are coupled to base drive circuits 64a and 64b, and to base drive circuits 64c and 64d, respectively. Base drive circuits 64a, 64b, 64c and 64d in turn switch transistors 12, 14, 18, and 16, respectively, of inverter 10 in accordance with timing signals from the outputs of flip-flops 62a and 62b. In the frequency control mode, the timing signals are such as to vary the frequency of the rectangular wave signal $V_a - V_b$ so as to minimize the error signal supplied to regulator 56.

Control 50 also contains a mode comparator 70 with hysteresis to determine when it is necessary to switch between frequency control mode and phase shift control mode. For example, in order to maintain the desired amplitude $V_d$ of converter output voltage $V_o$, the operating frequency of the rectangular wave voltage signal $V_a - V_b$ rises as the load becomes progressively lighter, eventually reaching an extremity of its operable range o. At that point, continued increase in load resistance results in a decrease in converter output voltage $V_o$, causing an increase in the control signal amplitude at junction c. Once the control signal rises to a predetermined level, mode comparator 70 senses that phase shift of the second square wave voltage signal $V_b$ relative to the first square wave voltage signal $V_a$ is required in order to maintain the output load voltage at a desired level $V_d$. Mode comparator 70 accomplishes this by comparing the control signal at junction c with a preset voltage amplitude $V_{\theta set}$. When the control signal at junction c exceeds the preset amplitude $V_{\theta set}$, mode comparator 70 supplies a signal that switches control 50 from frequency control mode to phase shift control mode. The switching function may be accomplished by alternatively enabling and disabling a diode 72. For example, diode 72 is enabled (forward biased) to switch control 50 to a frequency control mode and is disabled (reverse biased) by an output signal from mode comparator 70 to switch control 50 to a phase shift control mode. By employing hysteresis in mode comparator 70, oscillation of the mode comparator due to it drifting between frequency and phase shift control modes is avoided. When diode 72 is enabled (i.e., frequency control mode), control signal $V_c$ is prevented from reaching the negative input of a comparator 76 via buffer 74 because that input to comparator 76 is grounded through diode 72 and comparator 70.

When diode 72 is disabled, that is, when control 50 is in the phase shift control mode, the control signal from junction c is supplied via buffer 74 to phase shift comparator 76. Phase shift comparator 76 compares the control signal with the sawtooth signal produced by sawtooth generator 78, which is clocked by the output of voltage controlled oscillator 60. In so doing, phase shift comparator 76 determines the necessary phase shift or phase delay to maintain the desired converter output voltage amplitude $V_d$. For example, an increasing control signal at the input to phase shift comparator 76 will result in an increasing phase delay or phase shift signal being supplied by comparator 76 to the second flip-flop 62b which in turn supplies a delayed timing signal to base drive circuitry 64c and 64d to implement the appropriate phase delay of the second square wave signal $V_b$ relative to the first square wave signal $V_a$.

The operation of control 50 will now be described. The actual output load voltage $V_o$ coupled through isolation amplifier 52 is compared in summer 54 with commanded output voltage $V_o^*$ to develop an error signal. The error signal is applied to proportional plus integral regulator 56 which produces control signal $V_c$ at junction c. From junction c the control signal is supplied to mode comparator 70 which determines whether frequency control mode is adequate or whether phase control mode is needed. If the control signal at junction c exceeds a preset value, phase control mode is initiated by the mode comparator's disabling of diode 72. The present value $V_{\theta set}$ of control signal to which mode comparator 70 is adjusted is chosen to occur at the value where an inadequacy of output control by the frequency control mode would occur; i.e., when the frequency is at an extremity of the operating range of the inverter switching devices.

When operating in the frequency control mode, the relatively small control signal at junction c is supplied through limit amplifier circuit 58 to voltage controlled oscillator 60. The voltage controlled oscillator output signal is supplied to first flip-flop 62a and to sawtooth generator 78. The output signal of sawtooth generator 78, however, is prevented from actuating flip-flop 62b since the control signal at junction c is disabled from the input to comparator 76 by diode 72 as explained above. Thus, while in frequency control the commanded output phase delay at comparator 76 is zero. Flip-flop 62b is driven by flip-flop 62a at the same frequency thereof, by an output signal from flip-flop 62. However, the output signal from flip-flop 62b is 180° out of phase with the output signal of flip-flop 62a under this condition. Accordingly, base drive circuitry 64c and 64d operate transistors 18 and 16, respectively, 180° out of phase with transistors 12 and 14 which are driven by base drive circuitry 64a and 64b, respectively.

When the control signal at junction c exceeds a preset value, meaning that frequency control is no longer adequate, mode comparator 70 disables diode 72. The disabling of diode 72 results in transfer of the control signal at junction c via buffer 74 to the input of phase shift comparator 76. Comparator 76 consequently triggers flip-flop 62b after a time delay determined by the output voltage waveform from sawtooth generator 78. Flip-flop 62b then turns on transistors 16 and 18 of inverter circuit 10 shown in FIG. 1 through base drive circuitry 64c and 64d, respectively. Transistors 12 and 14 are turned on earlier by signals from base drive circuitry 64a and 64b, respectively, in response to an output signal from flip-flop 62a.

It will be noted from the above that this invention fully meets the objectives set forth. A resonant inverter is described with control circuitry that ensures control, during extended load conditions, of an output load voltage of a converter in which the resonant inverter is employed. Further, a resonant inverter control method is provided which allows for the maintenance of a desired output voltage under varying input power and output load conditions.

Although one embodiment has been illustrated in the accompanying drawings and described in the foregoing description for a particular resonant dc to dc to converter, it will be understood that the invention is not limited to the particular embodiment discussed but is capable of numerous rearrangements, modifications, and substitutions without departing from the scope of the invention. For example, the control technique would be equally applicable to different resonant inverter configurations. Other changes, within the scope of the invention as defined by the appended claims, will suggest themselves to those skilled in this art.

What is claimed is:

1. An improved dc-to-dc converter, comprising:
   a resonant inverter having two pairs of controllable switch means, the pairs of controllable switch means being adapted to be connected in parallel across a dc supply and each said pair of controllable switch means being connected in series;
   a series resonant circuit connected between the junctions of each said pair of controllable switch means;
   a full wave rectifier inductively coupled to said series resonant circuit, the output of said rectifier being adapted to supply substantially constant output voltage to a load;
   first means of control for controlling the output load voltage by varying the frequency of operation of each one of said controllable switch means within an operable frequency range of said controllable switch means;
   second means of control for controlling the output load voltage by phase shifting the operating frequency of one of said controllable switch means in one of said pairs adapted to be connected to a positive dc supply terminal and one of said controllable switch means in the other of said pairs adapted to be connected to a negative dc supply terminal while maintaining constant the frequency of operation of each one of said controllable switch means; and
   selection means coupled to said first and second means of control for selecting between said first means of control and said second means of control so that output load voltage is maintained substantially constant by said first means of control when the frequency of operation of each of said controllable switch means is within the operable range of said controllable switch means and by said second means of control when the frequency of operation of each of said controllable switch means is at an extremity of the operable range of said controllable switch means.

2. The improved dc-to-dc converter of claim 1, wherein said selection means comprises:
   measuring means coupled to the output of said inverter for determining when the frequency of operation of each of said controllable switch means is at an extremity of the operable range of said controllable switch means; and
   switching means coupled to said measuring means to actuate said first means of control when the frequency of operation of each of said controllable switch means moves to an extremity in the operable range of said controllable switch means and to actuate said second means of control when the frequency of said rectangular wave signal moves away from an extremity in the operable range.

3. The improved dc-to-dc converter of claim 1, wherein said first means of control comprises:
   first comparison means coupled to the output of said converter for comparing a commanded output voltage to the actual output load voltage and providing a control signal; and
   oscillator means responsive to said control signal for generating a frequency signal, said oscillator means being coupled to said controllable switch means to vary, in synchronism, the frequency of operation of each one of said controllable switch means.

4. The improved dc-to-dc converter of claim 3, wherein said second means of control comprises:
   sawtooth waveform generating means coupled to said oscillator means and being responsive to said frequency signal generated by said oscillator means;
   second comparison means coupled to said first comparison means and to said sawtooth waveform generating means for comparing said sawtooth wave signal to said control signal and providing a phase delay signal; and
   means coupling said second comparison means to each of said controllable switch means to thereby achieve said phase shifting.

5. The improved control of claim 4, wherein said measuring means comprises:
   third comparison means coupled to the output of said first comparison means for comparing a present reference signal to said control signal and generating a switching signal, said preset reference signal being representative of a rectangular wave voltage signal frequency at an extreme of the operable range of said controllable switch means, the output of said third comparison means being coupled to said switching means.

6. An improved control for a resonant inverter, said inverter including a resonant circuit and having controllable switch means which produces a first component signal and a second component signal, said component signals combining to form a rectangular wave signal which is applied to said resonant circuit, the output of said resonant inverter providing a substantially constant output voltage to a load, said improved control comprising:
   first means of control for controlling the output load voltage by varying the frequency of said rectangular wave signal within an operable range of said controllable switch means;
   second means of control for controlling the output load voltage by phase shifting said second component signal relative to said first component signal while maintaining the frequency of said first and second component signals constant; and selection means coupled to said first and second means of control for selecting between said first means of control and said second means of control so that output load voltage is maintained substantially constant by said first means of control when the frequency of said rectangular wave signal is within the operable range of said controllable switch means and by said second means of control when the frequency of said rectangular wave signal is at an extremity of the operable range of said controllable switch means.

7. The improved control of claim 6, wherein said selection means comprises:

measuring means coupled to the output of said inverter for determining when the frequency of said rectangular wave signal is at an extremity of the operable range of said controllable switch means; and switching means coupled to said measuring means to actuate said first means of control when the frequency of said rectangular wave signal moves to an extremity in the operable range of said controllable switch means and to actuate said second means of control when the frequency of said rectangular wave signal moves away from an extremity in the operable range.

8. The improved control of claim 6, wherein said first means of control comprises:

first comparison means coupled to the output of said inverter for comparing a commanded output voltage to the actual output load voltage and providing a control signal; and oscillator means responsive to said control signal for generating a frequency signal, said oscillator means being coupled to said controllable switch means to vary the frequency of the rectangular wave voltage signal supplied to said resonant circuit.

9. The improved control of claim 8, wherein said second means of control comprises:

sawtooth waveform generating means coupled to said oscillator means and being responsive to said frequency signal generated by said oscillator means;

second comparison means coupled to said first comparison means and to said sawtooth waveform generating means for comparing said sawtooth wave signal to said control signal and providing a phase delay signal; and means coupling said second comparison means to said controllable switch means to thereby shift phase of said second component voltage signal and thus vary the rectangular wave voltage signal supplied to said resonant circuit.

10. The improved control of claim 9 wherein said measuring means comprises:

third comparison means coupled to the output of said first comparison means for comparing a preset reference signal to said control signal and generating a switching signal, said present reference signal being representative of a rectangular wave voltage signal frequency at an extremity of the operable range of said controllable switch means, the output of said third comparison means being coupled to said switching means.

11. A method for controlling a resonant inverter, said inverter having controllable switch means which produces a first component signal and a second component signal, said component signals combining to form a rectangular wave signal which is applied to a resonant circuit, the output of aid resonant inverter providing a substantially constant output voltage and current to a load, said control method comprising the steps of:

varying the frequency of said rectangular wave signal when within an operable range of said controllable switch means; and phase shifting said second component signal relative to said first component signal while maintaining the frequency of said first and second component signals constant when at an extremity of the operable range of said controllable switch means.

12. The method of claim 11, further comprising the step of:

selecting between varying the frequency of said rectangular wave signal and phase shifting said second component signal relative to said first component signal while maintaining the frequency of said rectangular wave signal constant.

* * * * *